United States Patent [19]

Minart

[11] 4,402,577
[45] Sep. 6, 1983

[54] EYEGLASS FRAME WITH DETACHABLE FRAME FRONT

[75] Inventor: François Minart, Saint Germain en Laye, France

[73] Assignee: Essilor International, cie Generale d'Optique, Creteil, France

[21] Appl. No.: 233,566

[22] Filed: Feb. 11, 1981

[30] Foreign Application Priority Data

Feb. 18, 1980 [FR] France .................................. 80 03466

[51] Int. Cl.³ .......................... G02C 5/10; G02C 5/00
[52] U.S. Cl. ..................................... 351/125; 351/140
[58] Field of Search ............... 351/125, 149, 133, 134, 351/135, 140, 150, 124, 105, 98; 2/442, 443

[56] References Cited

U.S. PATENT DOCUMENTS

| 2,380,638 | 7/1945 | D'Urbano | 351/105 |
| 3,238,005 | 3/1966 | Petitto | 351/47 |
| 3,713,732 | 1/1973 | Gooch | 351/153 |
| 4,345,824 | 8/1982 | Daubignard | 351/88 |

FOREIGN PATENT DOCUMENTS 478645 12/1915 France .................................. 351/149
2094810 4/1972 France.

Primary Examiner—John K. Corbin
Assistant Examiner—Rodney B. Bovernick
Attorney, Agent, or Firm—Charles E. Brown

[57] ABSTRACT

An eyeglass frame with a detachable frame front is disclosed. The eyeglass frame comprises a main frame structure including a main cross bar and hinged temples at its ends, and the separate, detachable frame front comprises rims interconnected by a pair of parallel cross members defining a bridge. A fastener member or pad is secured to the underside of the main cross bar and has a pair of parallel grooves cooparable with the cross members for releasably securing the latter in position. One of the grooves is along the front surface of the fastener member and the other groove lies along the lower surface thereof. The fastener member also has one or more apertures cooperable with teats on an additional (sun) frame front for releasable securing the latter. Alternatively the additional frame front may be pivotally mounted on the fastener member.

9 Claims, 8 Drawing Figures

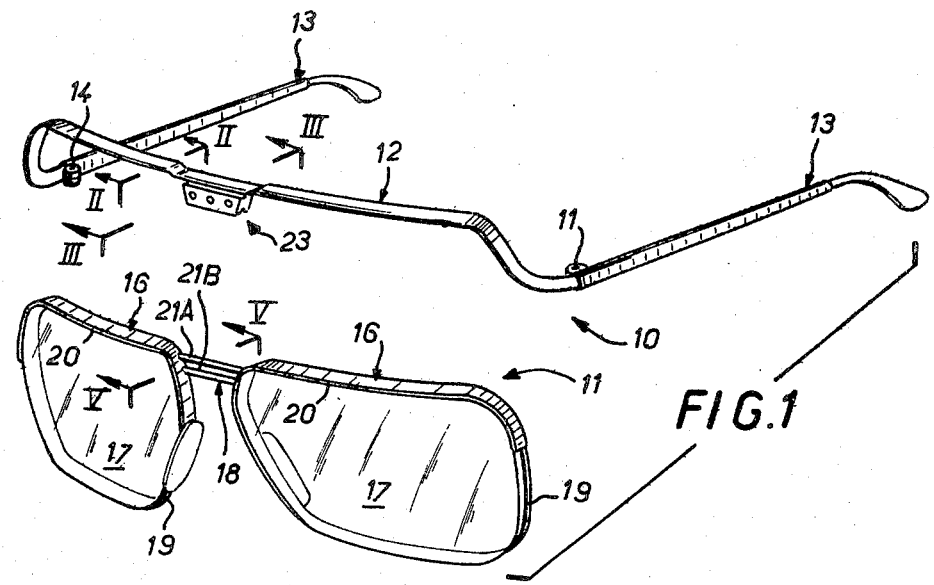
FIG.1
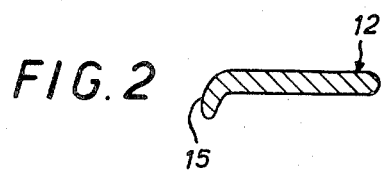
FIG.2
FIG.3 FIG.4
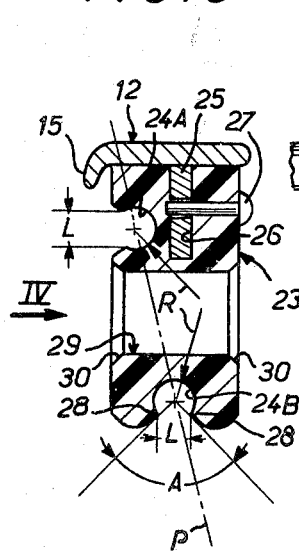
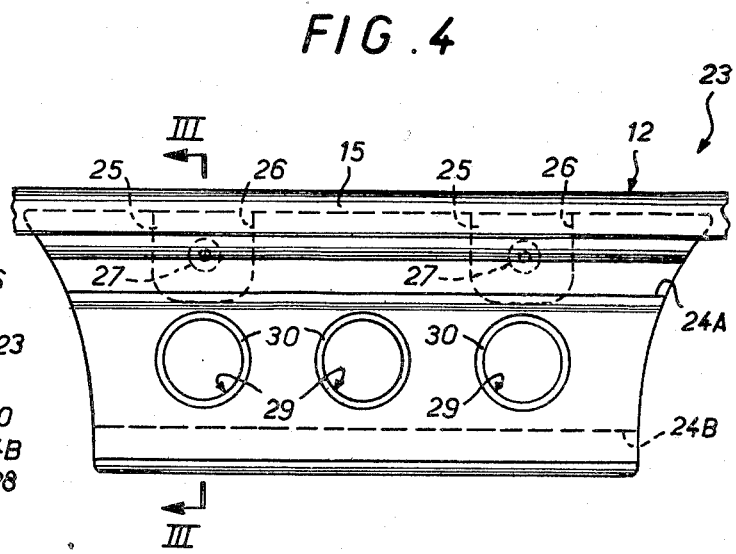

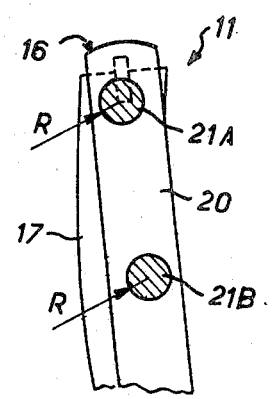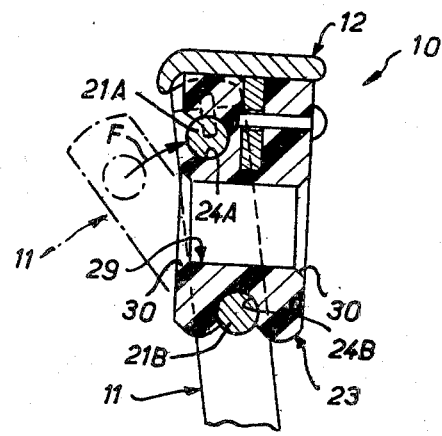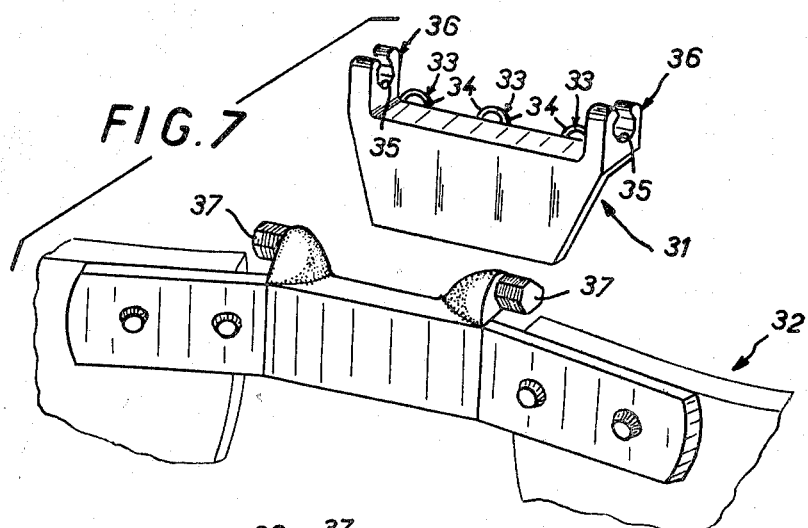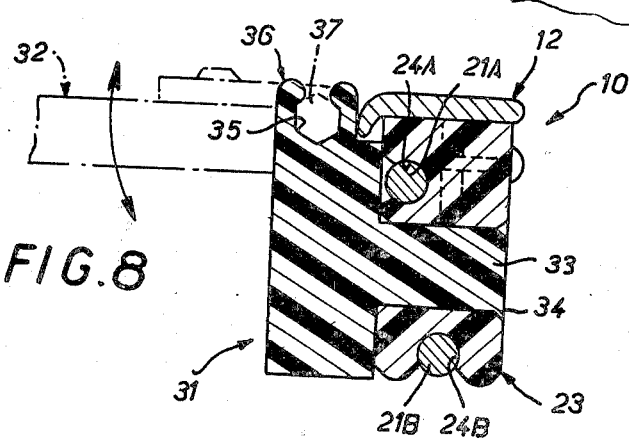

EYEGLASS FRAME WITH DETACHABLE FRAME FRONT

FIELD OF THE INVENTION

The present invention relates generally to eyeglass frames of the type having a main frame structure and a separate, detachable frame front adapted to be releasably secured on the main frame structure.

BACKGROUND OF THE INVENTION

Such eyeglass frames have been disclosed in published French patent application No. 2,094,810 and U.S. Pat. No. 3,713,732 and have the advantage of simplifying the mounting or positioning of the ophthalmic lenses therefor. Indeed the mounting of the lenses may be carried out in a single operation, and/or facilitate the changing, at will, of such ophthalmic lenses depending on the conditions of use, near or far vision, and/or the ambient lighting conditions. A single main frame structure may be utilized for supporting various frame fronts each of which may be separately stored more compactly than entire eyeglasses or spectacles.

But the practical embodiments of such eyeglass frames proposed to date, particularly in the aforesaid patents does not satisfy the usual aesthetic and convenience desiderata. The arrangement with a threaded fastener in French printed patent application No. 2,094,810 is unreliable and the aesthetics of the eyeglass disclosed in U.S. Pat. No. 3,713,732 is not to everyone's taste.

OBJECTS AND SUMMARY OF THE INVENTION

A general object of the invention is an eyeglass frame having a main frame structure and a separate, detachable frame front free of, or at least very substantially mitigating, the drawbacks of such known eyeglass frames.

According to the invention there is provided an eyeglass frame comprising a main frame structure and a separate, detachable frame front, the frame front having a bridge portion defined by a pair of parallel cross members, and means for releasably mounting the frame front on the main frame structure being characterized by a fastener member having a pair of parallel grooves releasably engageable with the cross members.

Owing to this arrangement the mounting of the frame front is very easy. One of the transverse members is received in its associated groove in the fastener member and then the main frame structure is simply swung until the other transverse member engages its corresponding groove in the fastener member. No tool or even implement is necessary to mount the frame front on the main frame structure.

Moreover, the aesthetics of the frame front is generally unrestricted since it is only slightly affected by the manner of mounting the frame front on the main frame structure peculiar to the invention.

Furthermore, since the mounting of the frame front is by means of a fastener member, the latter may be made of plastic and therefore is, to a certain extent, elastically deformable and advantageously functions as a damping member between the main frame structure and the detachable frame front secured thereto. This tends to minimize any possible adverse effects due to impact on the frame itself or on the wearer should the frame front be changed without removing the main frame structure from the wearer's head.

According to an additional feature of the invention such a fastener member advantageously is provided with detent means cooperable with complementary detent means on an additional frame front, e.g., a sun frame front, adapted to overlie the first-mentioned frame front.

The features and advantages of the invention will be brought in the description which follows, given by way of example, with reference to the accompanying schematic drawings.

BRIEF DESCRIPTION OF THE DRAWINGS

FIG. 1 shows an exploded perspective view of an eyeglass frame embodying the invention;

FIGS. 2 and 3 show, on an enlarged scale, cross-sectional view through the carrier structure of the frame, respectively along lines II—II and III—III in FIG. 1;

FIG. 4 shows an elevational view on the same scale as FIGS. 2 and 3, viewed in the direction of arrow IV in FIG. 3;

FIG. 5 is a fragmentary cross-sectional view of the frame front of the frame embodying the invention, taken on line V—V in FIG. 1;

FIG. 6 is a view similar to FIG. 3 illustrating the swinging into place of the frame front;

FIG. 7 shows a fragmentary, exploded perspective view of an additional frame front and a plate member adapted to be secured to the eyeglass frame according to the invention; and FIG. 8 shows a view similar to that of FIG. 6 illustrating the swinging into position of the plate member and the additional frame front.

DETAILED DESCRIPTION OF THE PREFERRED EMBODIMENTS

As shown in FIG. 1, the eyeglass frame, according to the invention, comprises a main frame structure 10 and a separate, detachable frame front adapted to be releasably mounted on the main frame structure 10.

In the illustrated embodiment the main frame structure 10 comprises a main cross bar 12 and two side pieces or temples 13 which, as is conventional, are hinged to the main cross bar 12 by means of knuckles 14.

In the illustrated embodiment the main cross bar 12 is formed as a flat metal section with a depending forward lip 15 of suitable shape as shown in FIG. 2 on its own.

As is known per se, the frame front 11 comprises two rims 16 each adapted to receive an ophthalmic lens and a central bar 18 interconnecting the rims 16.

In the illustrated embodiment at least part of each rim comprises a flexible strip 19 attached to the ends of the relatively rigid rest of the rim 20. The flexible strip 19 is adapted to be received in a groove formed in the edge of its associated ophthalmic lens 17. The details of this arrangement which are not part of the present invention will not be described in detail herein. Moreover it goes without saying that this arrangement in no way limits the present invention. Indeed any configuration of rims of the frame fronts may be employed without in any way departing from the spirit and scope of the invention.

In any event the central bar 18 comprises two parallel cross members 21A, 21B disposed substantially one above the other parallel to the general plane 11 of the rest of the frame front 11.

In the present embodiment these cross members 21A, 21B are, for example, secured by soldering, brazing or bonding to the relatively rigid part of the rims 16 or are formed integrally therewith. The cross members 21A, 21B have identical sections, circular with a radius R as shown in FIG. 5.

For releasably securing the front face 11 the main frame structure 10 comprises, according to the invention, a fastener member or pad 23 having two parallel grooves 24A, 24B adapted to releasably engage the cross members 21A, 21B of the frame front 11.

In the illustrated embodiment the fastener member 23 comprises a separate part suitably secured to the main cross bar 12 of the main frame structure 10. For this purpose the frame structure comprises on its lower face depending lugs 25 on which the fastener member 23 is mounted by corresponding recesses 26 and secured in place by pins or screws 27 as shown in FIGS. 3 and 4.

In the illustrated embodiment the fastener head 23 extends downwards from the main cross bar 12 of the main frame structure 10.

In any event since the fastener member 23 comprises a part separate from the main cross bar 12 it may advantageously be made of a different material. For example it may be made of an elastically deformable material or a synthetic material or plastic having at least some degree of elastic deformation.

In the illustrated embodiment the groove 24A in the fastener member 23 extends along the front face of the fastener member and the groove 24B extends along the lower face thereof.

The grooves are of circular cross section complementary to that of the cross members 21A, 21B interconnecting the rims. The radius of the cross sections of the grooves is therefore substantially equal to radius R of the cross section of the cross members.

At least one of the grooves 24A, 24B has a cross section with an angular opening at the center A less than 180° so that the lips 28 formed by the ends of the grooves define an engagement opening having a width L less than twice the radius. In the illustrated embodiment this arrangement is adopted for each of grooves 24A, 24B.

Moreover, in the illustrated embodiment the plane P containing the axes of the grooves 24A, 24B is inclined with respect to the general plane of the frame front away from the temples in the upward direction.

Finally, as shown, and for reasons which will be brought out hereinbelow, the fastener member 23 has at least one transversely extending aperture, i.e., perpendicular to the general plane of the main cross bar 12. Preferably three such apertures are provided parallel to each other.

The ends of the apertures 29 have flaring chamfers 30.

As shown in FIG. 6 the frame front 11 may be very easily and quickly mounted on the main frame structure 10. First, the cross member 21A is inserted into the corresponding groove 24B in the fastener member 23. The engagement of the cross member in the groove 24B involves elastic deformation or a detenting action of the lips 28 of the groove 24B. Then, by pivoting the frame front 11 about the cross member 21B, as schematically represented by arrow F in FIG. 6, the cross member 21A is inserted into its corresponding groove 24A in the same manner as cross member 21B in groove 24B.

After these steps have been completed the cross members 21A, 21B are detented in position in their corresponding grooves 24A, 24B in the fastener member so that the frame front 11 is firmly secured on the main frame structure 10.

According to a modified embodiment as illustrated in FIGS. 7 and 8, the apertures 29 in the fastener member 23 are used to comprise detenting means. A plate member 31 provided with complementary detecting means is associated with the fastener member and adapted to carry an additional frame front 32 shown in phantom lines.

In practice, the plate member 31 has protruding teats 33, three as shown, each being adapted to snap into one of the apertures in the fastener member 23 by means of an enlarged or flared end 34 adapted to cooperate with the chamfer 30 of the corresponding aperture 29. The teats 33 and apertures 29 thus comprise snap type detenting means, permitting the plate member 31 to be removably secured to the fastener member 23.

The plate member 31 also comprises two recesses 35 parallel to each other comprising, in the illustrated embodiment, elastically deformable bifurcated members for pivotally mounting the additional frame front by means of journals 37. The journals 37, in the illustrated embodiment, extend outwardly in opposed directions. The additional frame front 32 may be mounted on the bifurcated members 36 of the plate member 31 by their elastic deformation. Preferably, the cross section of the journals 37 and the cross section of the recesses 35 are polygonal as shown.

Accordingly, once the additional frame front 32 is in position on the plate member 31 it may be swung to two limit positions, i.e., a substantially horizontal position as shown in phantom lines in FIG. 8, and an operative position, substantially parallel to the frame front 11 which it is intended to overlie. As the reader will have already understood the additional frame front 32 may be used as a sun front.

The present invention is, of course, not limited to the illustrated and described embodiments but encompasses various modifications and alternatives without departing from the scope of the appended claims, namely with regard to the section of the cross members interconnecting the rims, one or both of these not necessarily being circular.

Further, in case the sun front or accessory is provided it is not necessarily pivotally mounted. Alternatively it may be rigidly secured to the plate member adapted to be secured to the fastener member on the main frame structure of the eyeglass frame.

What I claim is:

1. An eyeglass frame comprising a main frame structure and a separate, detachable frame front, said frame front having a bridge portion defined by a pair of parallel cross members, means for releasably mounting said frame front on said main frame structure including a fastener member having a pair of parallel grooves releasably engageable with said cross members.

2. The eyeglass frame according to claim 1, wherein said grooves in said fastener member are of circular cross section, the circular cross section of at least one of the grooves having a central angular opening of less than 180°.

3. The eyeglass frame according to claim 1, said fastener members having a front surface and a lower surface, wherein one of said grooves extends laterally along the front surface and the other of said grooves extends laterally along said lower surface.

4. The eyeglass frame according to claim 1, 2 or 3, wherein the axes of said grooves lie in a plane inclined with respect to the vertical.

5. The eyeglass frame according to claim 1, 2, or 3, a plate member for carrying an additional frame front, complementary detent means provided on said fastener member and said plate for releasably securing said plate member on said fastener member.

6. The eyeglass frame according to claim 5, further comprising two recesses for pivotally mounting said additional frame front on complementary journals provided on said additional frame front.

7. The eyeglass frame according to claim 6, wherein the cross sections of said recesses and said journals are polygonal.

8. The eyeglass frame according to claim 1, 2 or 3, wherein said fastener member comprises an elastically deformable pad.

9. The eyeglass frame according to claim 1, said main frame structure comprising a main cross bar and temples hinged at the ends thereof, wherein said fastener member is secured to the undersurface of said main cross bar.

* * * * *